Figure 1:
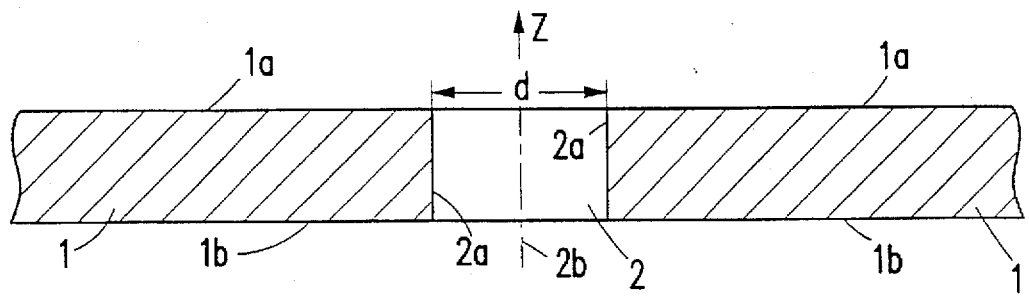

United States Patent [19]

Kunze et al.

[11] Patent Number: 5,743,015
[45] Date of Patent: Apr. 28, 1998

[54] METHOD OF SECURING A SHAFT-BEARING BUSH OF A NON-WELDABLE MATERIAL IN A HOLE IN A METAL MOUNTING PLATE

[75] Inventors: Norbert Kunze, Ehringshausen; Dieter Müller, Staufenberg, both of Germany

[73] Assignee: U.S. Philips Corporation, New York, N.Y.

[21] Appl. No.: 655,531

[22] Filed: May 30, 1996

[30] Foreign Application Priority Data

Jun. 3, 1995 [DE] Germany ............ 195 20 474.3

[51] Int. Cl.$^6$ ................................. B23P 11/00
[52] U.S. Cl. ................ 29/898.07; 29/898.054; 29/525.14; 29/464; 384/441
[58] Field of Search .............. 29/898.07, 898.054, 29/464, 525, 525.14; 384/441

[56] References Cited

U.S. PATENT DOCUMENTS

| | | | |
|---|---|---|---|
| 1,700,100 | 1/1929 | Smith | 29/898.054 |
| 1,753,632 | 4/1930 | Williams et al. | 29/898.054 |
| 3,176,378 | 4/1965 | Janiszewski | 29/898.07 |
| 3,445,908 | 5/1969 | Straub | 29/898.07 |
| 4,939,827 | 7/1990 | Iizuka | 29/525 |
| 5,129,253 | 7/1992 | Austin et al. | 29/525 |
| 5,203,812 | 4/1993 | Eclcold et al. | 29/464 |
| 5,341,559 | 8/1994 | Reid et al. | 29/898.07 |
| 5,452,504 | 9/1995 | Tatro et al. | 29/898.07 |
| 5,529,404 | 6/1996 | Robinson et al. | 29/898.062 |

FOREIGN PATENT DOCUMENTS

| | | | |
|---|---|---|---|
| 0111370 | 11/1928 | Germany | 29/898.07 |
| 4328211A1 | 2/1995 | Germany | B23K 26/02 |

*Primary Examiner*—Larry I. Schwartz
*Assistant Examiner*—Marc W. Butler
*Attorney, Agent, or Firm*—Robert M. McDermott

[57] ABSTRACT

The invention relates to a method of securing a shaft-bearing bush (3) of a non-weldable material, particularly a sintered metal, in a hole (2) in a metal mounting plate (1), a metal sleeve (4), whose material is weldable to the metal mounting plate (1), being securely press-fitted onto the outer wall (3a) of the shaft-bearing bush (3), the press-fitted metal sleeve (4) being introduced into the hole (2) in the metal mounting plate (1) and being locked in the desired axial alignment, and the metal sleeve (4) being welded to the metal mounting plate (1).

7 Claims, 3 Drawing Sheets

METHOD OF SECURING A SHAFT-BEARING BUSH OF A NON-WELDABLE MATERIAL IN A HOLE IN A METAL MOUNTING PLATE

The invention relates to a method of securing a shaft-bearing bush of a non-weldable material, particularly a sintered metal, in a hole in a metal mounting plate.

A known possibility of mounting such shaft-bearing bushes in a hole in a metal mounting plate is by riveting. In said method the shaft-bearing bush is secured in the metal mounting plate by means of a tubular rivet. For this purpose, the shaft bearing bush is first inserted into the internally hollow shank of the rivet and subsequently the shank with the shaft-bearing bush inserted in it is introduced into the hole in the metal mounting plate. After this, the shank portion which projects from the surface of the metal mounting plate is formed into a closing head by means of a riveting tool which moves around the edge of shank along a circular path. In magnetic-tape-cassette apparatuses such shaft-bearing bushes are used for journaling the capstans which in conjunction with rubber pressure rollers move the magnetic tape past the magnetic head of the magnetic-tape-cassette apparatus. For the correct operation of the magnetic-tape-cassette apparatus it is important that the magnetic tracks of the magnetic tape are always accurately positioned relative to the head gaps of the magnetic head. In order to guarantee this, it is necessary that the capstans occupy and remain very accurately in a given axial position relative to the apparatus chassis of the magnetic-tape-cassette apparatus. The shaft-bearing bush which journals the capstan should likewise occupy and remain very accurately in a given axial position relative to the apparatus chassis. With the described riveting method this exact axial position of the shaft-bearing bush relative to the apparatus chassis may be affected by disturbing radial forces acting on the shaft-bearing bush during the circular motion of the riveting tool around the edge of the rivet shank.

A further possibility of securing a shaft-bearing bush in a metal mounting plate is by an adhesion process. However, often such an adhesive joint is not reliable enough, particularly in the case of extreme temperature fluctuations. A further disadvantage of the adhesion process is the comparatively long process time because the adhesive should be allowed to cure for a given time after it has been applied.

DE 4328211 A1 describes a method of securing an apparatus part, particularly a shaft or a bearing bush, in a hole in a metal mounting plate. This base plate has a protective layer on its surface. Adjoining peripheral areas of the hole and the part are fused to one another by means of laser light. With this method the protective layer of the base plate is broken up or removed by mechanical deformation in the fusing area prior to fusing, so as to expose the bare metal in the fusing area.

It is an object of the invention to provide a method by means of which a shaft-bearing bush of a non-weldable material can be secured rapidly and reliably in a hole in a metal mounting plate in an accurately defined axial position.

According to the invention this object is achieved in that a metal sleeve, whose material is weldable to the metal mounting plate, is securely press-fitted onto the outer wall of the shaft-bearing bush, the shaft-bearing bush provided with the press-fitted metal sleeve is introduced into the hole in the metal mounting plate and is locked in the desired axial alignment, and the metal sleeve is welded to the metal mounting plate.

By pressing-on the metal sleeve, whose material is weldable to the metal mounting plate, it is possible to use a welding method. The metal sleeve can be manufactured, for example by machining or by deep-drawing. When the metal sleeve is welded to the metal mounting plate no or only very small disturbing forces are exerted on the shaft-bearing bush. Welding does not affect the axial alignment. In comparison with a method of securing the shaft-bearing bush in the hole of the metal mounting plate by means of an adhesion process, the method in accordance with the invention has the advantage that the welded joint is far more reliable than an adhesive joint, particularly in the case of large temperature fluctuations. A further advantage as compared with an adhesion process is that the process time for welding is short. The cooling phase required for the welded joint after welding is substantially shorter than the curing phase required for the adhesive joint after application of the adhesive material.

An advantageous variant of the method is characterized in that an alignment pin is introduced into the shaft-bearing bush for the alignment in the axial direction and the desired bearing orientation of the shaft-bearing bush relative to the metal mounting plate is realized by aligning the shaft-bearing bush relative to the alignment pin.

The alignment pin is a means of realizing the desired axial position of the shaft-bearing bush relative to the metal mounting plate. Thus, it is for example possible to use a computer-controlled positioning device, which aligns the alignment pin and hence the shaft-bearing bush so as to obtain a desired axial position relative to the metal mounting plate. Moreover, a simple alignment by hand is also possible. The alignment pin may already be in alignment when introduced into the shaft-bearing bush or it may subsequently be aligned together with the shaft-bearing bush.

A further advantageous variant of the method is characterized in that the surface of the metal mounting plate, except for the hole wall, has been provided with a protective layer, and the peripheral areas of the hole are deformed as a kind of socket in such a manner that parts of the hole wall which are free from the protective layer will adjoin the metal sleeve upon introduction of the shaft-bearing bush provided with the pressed-fitted metal sleeve.

This protective layer prohibits a perfect welding of the metal mounting plate to the metal sleeve. To enable a welding method to be used all the same, the peripheral areas of the hole are deformed in such a manner, for example by means of a cold extrusion method, that parts of the hole wall which are free from the protective layer will adjoin the metal sleeve upon introduction of the shaft-bearing bush provided with the pressed-fitted metal sleeve. After this deformation the exposed bare metal of the hole wall can be welded properly to the metal sleeve.

A preferred variant of the method is characterized in that welding is effected simply and reliably by means of a laser beam.

By means of the method in accordance with the invention it is possible to manufacture bearings, which are characterized in that a metal sleeve has been press-fitted securely onto the outer wall of a shaft-bearing bush of a non-weldable material, particularly a sintered metal, the shaft-bearing bush provided with the metal sleeve has been introduced into a hole in a metal mounting plate in a desired axial alignment, and the metal sleeve has been welded to the metal mounting plate.

Figure 2:
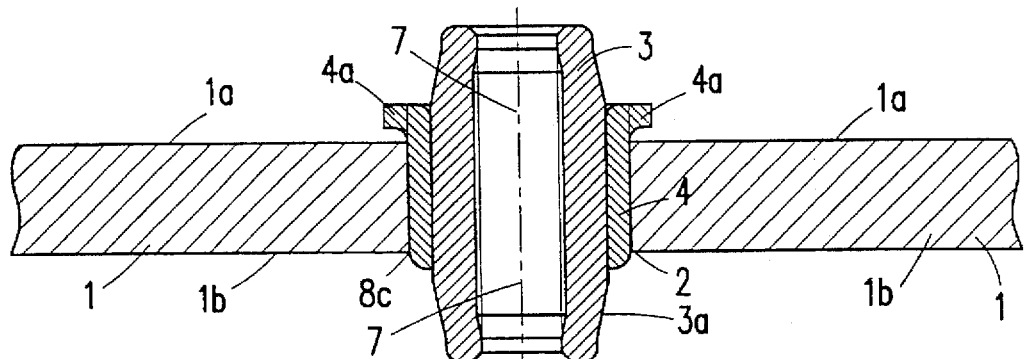
Figure 3:
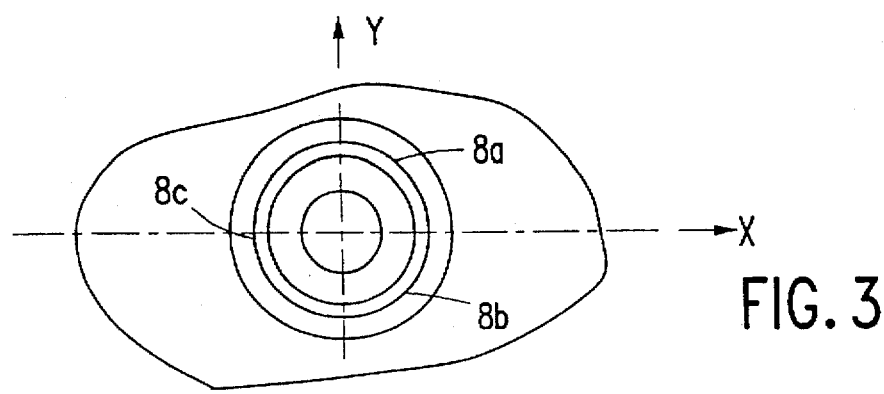
Figure 4:
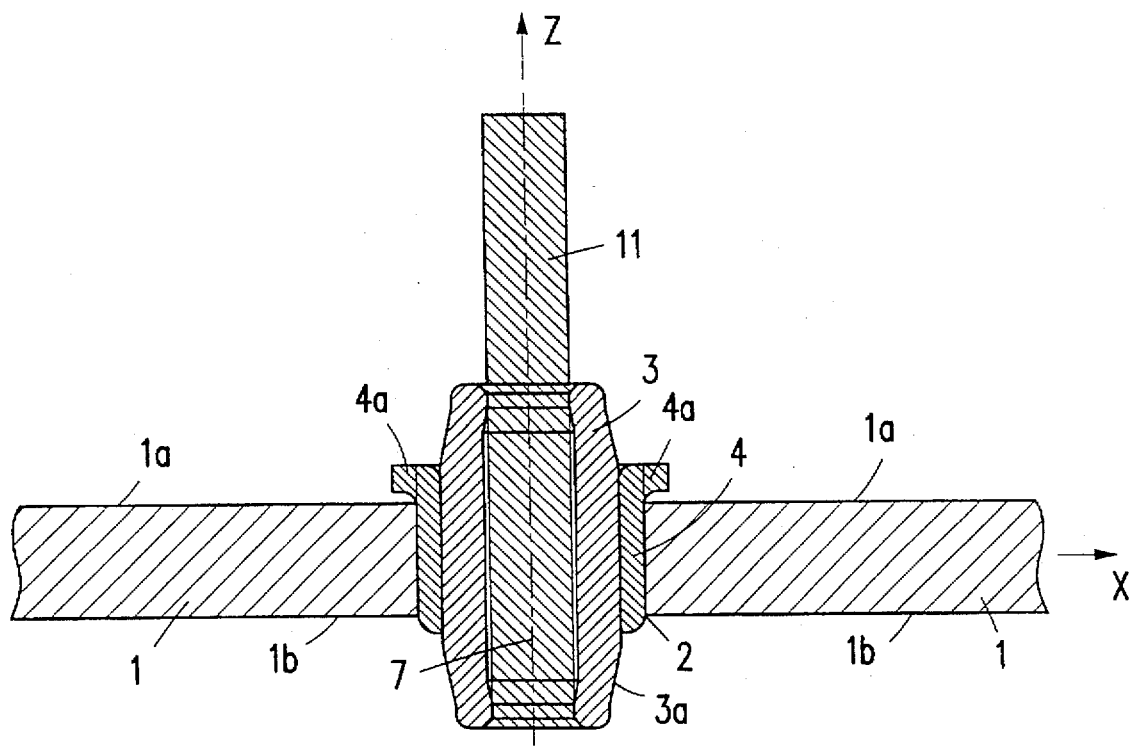
Figure 5:
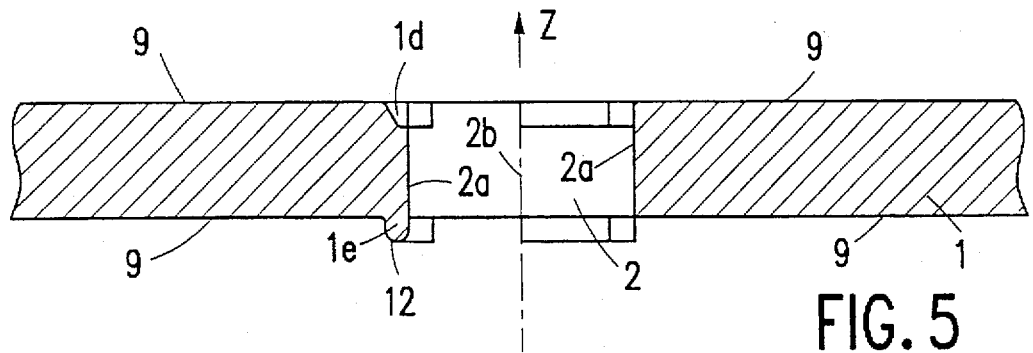
Figure 6:
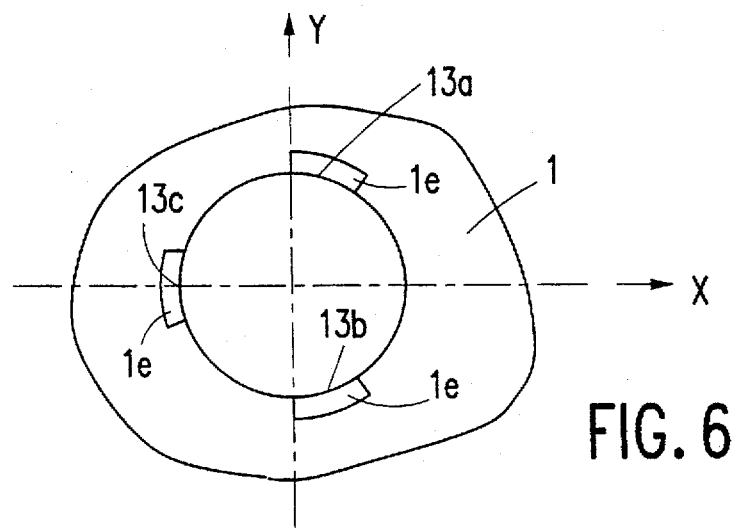
Figure 7:
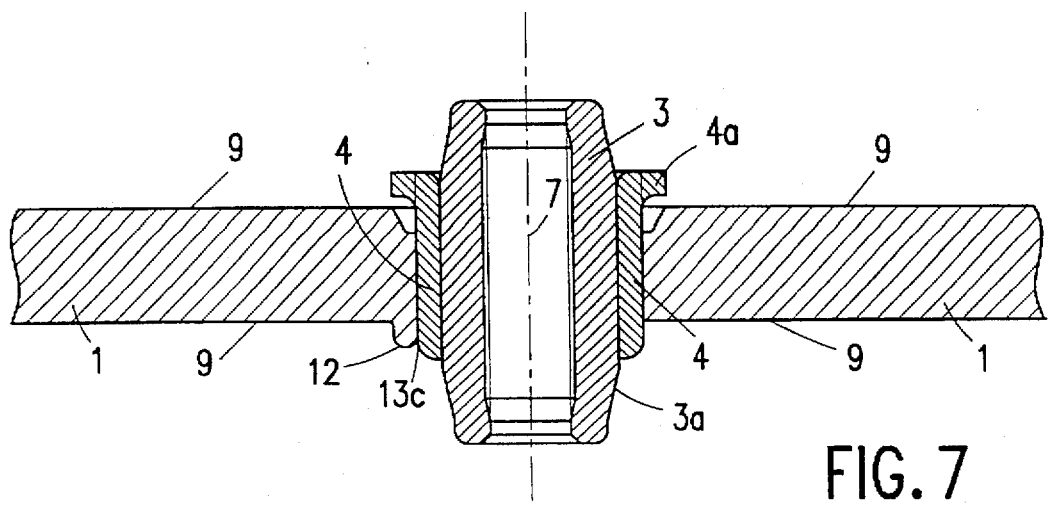

Some diagrammatic examples of the subject matter of the invention will be described in more detail with reference to FIGS. 1 to 7 of the drawings. In the drawings:

FIG. 1 is a sectional view of a part of a metal mounting plate with a hole in which a shaft-bearing bush of a non-weldable material is to be secured, FIG. 2 is a sectional view of the metal mounting plate, in the hole of which the shaft-bearing bush provided with a metal sleeve has been welded, FIG. 3 is a plan view of the underside of the metal mounting plate shown in FIG. 2, FIG. 4 is a sectional view of the metal mounting plate shown in FIG. 2, with an alignment pin introduced in the shaft-bearing bush for alignment purposes, FIG. 5 is a sectional view showing as another example the metal mounting plate provided with a protective layer, peripheral areas of the hole in the metal mounting plate being deformed partly as a kind of socket, FIG. 6 is a plan view of the underside of the metal mounting plate shown in FIG. 5, FIG. 7 is a sectional view of the metal mounting plate shown in FIG. 5, in the hole of which, whose peripheral areas have been deformed partly as a kind of socket, the shaft-bearing bush provided with a metal sleeve has been welded.

FIG. 1 shows a part of a metal mounting plate 1, which has two main surfaces 1a and 1b, a hole 2 having a diameter d, hole walls 2a and a central axis 2b. This metal mounting plate 1 may be, for example, a deck plate of a magnetic-tape-cassette apparatus. An internally hollow shaft-bearing bush 3, shown in FIG. 2 and made of a non-weldable material, particularly a sintered metal, is to be secured in the hole 2, so as to obtain an accurately defined orientation of the central axis 7 of the shaft-bearing bush 3 relative to an X, Y and Z direction and an accurate angular position relative to the metal mounting plate. The X and the Y direction each extend parallel to the surface of the metal mounting plate 1 and the Z direction extends perpendicularly to the surface of the metal mounting plate 1. In magnetic-tape-cassette apparatuses such shaft-bearing bushes 3 are used for the journaling of capstans, not shown. For the correct operation of a magnetic-tape-cassette apparatus it is essential that the capstans, and hence the shaft-bearing bushes by means of which the capstans are journaled, are aligned and secured in an accurately defined axial position in the hole 2 in the metal mounting plate 1. To secure them it is desirable to use a welding method because this is a rapid, clean and reliable method, in which the parts to be welded are subjected to small forces only. However, since the shaft-bearing bush 3 consists of a non-weldable material, particularly a sintered metal, direct welding to the metal mounting plate 1 is not possible. According to the invention the shaft-bearing bush 3 of a non-weldable material is press-fitted into a metal sleeve 4. This metal sleeve 4 can be manufactured by turning or, preferably, by deep-drawing. The metal sleeve 4 shown in FIG. 2 has been manufactured by deep-drawing and, as a result of this, it has a circumferential collar 4a. The pressed-fitted metal sleeve 4 in accordance with the invention enables the shaft-bearing bush 3 provided with the metal sleeve 4 to be welded to the metal mounting plate 1. For this purpose, the shaft-bearing bush 3 provided with the metal sleeve 4 is introduced into the hole 2 in the metal mounting plate 1 and brought into a desired axial alignment, the collar 4a of the metal sleeve 4 being not in direct contact with the surface 1a of the metal mounting plate 1. At the other side 1b of the metal mounting plate 1 the metal sleeve 4 is now welded to the metal mounting plate 1 in at least three points 8a to 8e (see FIG. 3).

It may be advantageous to align the shaft-bearing bush 3 relative to the metal mounting plate 1 by means of an alignment pin 11 shown in FIG. 4. For this purpose, the alignment pin 11 is first fitted with minimal play into the shaft-bearing bush 3 provided with the metal sleeve. Now the shaft-bearing bush 3 is aligned parallel to the alignment pin by means of a force which acts on it in lateral direction. Subsequently, the alignment pin 11 and hence the shaft-bearing bush 3, which is positively or frictionally locked to this pin, is aligned relative to the metal mounting plate 1. For this purpose the alignment pin 11 may, for example, cooperate with a computer-controlled positioning device, not shown. However, the alignment pin 11 also allows a simple alignment by hand. Moreover, it is possible to use a fixed alignment pin 11 which has been pre-aligned relative to the metal mounting plate 1 and to align the shaft-bearing bush 3 by means of a force which acts on the shaft-bearing bush 3 in lateral direction parallel to this pre-aligned alignment pin 11.

The metal mounting plate I shown in FIG. 1 has been provided with a protective layer 9 of a non-weldable material, for example zinc. To enable the metal mounting plate 1 to be welded to the metal sleeve 4 in spite of this, the peripheral areas of the hole 2 are deformed, for example by means of a cold-extrusion method. In the present example, this process results in three recesses 1d and three projections 1e being formed in the peripheral area of the hole 2 in the metal mounting plate 1, uniformly spaced along the circumference. FIG. 6 shows an example of a possible arrangement of the projections 1e and the recesses 1d along the circumferential edge of the hole 2. The projections 1e have edges 12 where the protective layer 9 has been removed as a result of the deformation of the peripheral area of the hole 2 by means of the cold-extrusion process. Now the shaft-bearing bush 3 provided with the metal sleeve 4 is fitted into the hole 2 of the metal mounting plate 1 and is aligned. Subsequently, the metal sleeve 4 is welded to the bared edges 12 of the projections 1e of the metal mounting plate 1, for example at the three welding points 13a to 13c shown in FIG. 6.

We claim:

1. A method of securing a shaft-bearing bush of a non-weldable material, particularly a sintered metal, to a metal mounting plate having a hole wall forming a hole, characterized in that a metal sleeve, whose material is weldable to the metal mounting plate, is securely press-fitted onto the outer wall of the shaft-bearing bush, the shaft-bearing bush provided with the press-fitted metal sleeve is introduced into the hole in the metal mounting plate and is locked in a desired axial alignment, and the metal sleeve is welded to the metal mounting plate.

2. A method as claimed in claim 1, characterized in that an alignment pin is introduced into the shaft-bearing bush for the desired axial alignment, and a desired bearing orientation of the shaft-bearing bush relative to the metal mounting plate is realized by aligning the shaft-bearing bush relative to the alignment pin.

3. A method as claimed in claim 2, characterized in that welding is effected by means of a laser beam.

4. A method as claimed in claim 1, characterized in that a surface of the metal mounting plate, except for the hole wall, has been provided with a protective layer, and the hole wall is deformed in such a manner that parts of the hole wall will adjoin the metal sleeve upon introduction of the shaft-bearing bush provided with the pressed-fitted metal sleeve.

5. A method as claimed in claim 4, characterized in that welding is effected by means of a laser beam.

6. A method as claimed in claim 1, characterized in that welding is effected by means of a laser beam.

7. A method as claimed in claim 1, characterized in that a surface of the metal mounting plate, except for the hole wall, has been provided with a protective layer, and the hole wall is deformed in such a manner that parts of the hole wall will adjoin the metal sleeve upon introduction of the shaft-bearing bush provided with the press-fitted metal sleeve.

* * * * *